United States Patent
Yeh et al.

(10) Patent No.: US 7,573,599 B2
(45) Date of Patent: Aug. 11, 2009

(54) METHOD OF PRINTING GEOMETRIC FIGURES

(75) Inventors: Yu-Ling Yeh, Taipei (TW); Fu-Chin Wen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 960 days.

(21) Appl. No.: 10/849,048

(22) Filed: May 20, 2004

(65) Prior Publication Data

US 2005/0259125 A1    Nov. 24, 2005

(51) Int. Cl.
    B41J 29/393    (2006.01)
(52) U.S. Cl. .................... 358/1.18; 347/19; 358/1.13
(58) Field of Classification Search ............... 347/19; 395/143, 141; 382/299; 358/1.9, 1.18
    See application file for complete search history.

(56) References Cited

U.S. PATENT DOCUMENTS

| | | | | |
|---|---|---|---|---|
| 4,896,029 A * | 1/1990 | Chandler et al. | ............ | 235/494 |
| 4,943,935 A * | 7/1990 | Sato | ............ | 345/442 |
| 5,404,431 A * | 4/1995 | Kumazaki et al. | ............ | 345/443 |
| 5,553,208 A * | 9/1996 | Murata et al. | ............ | 345/582 |
| 6,005,584 A * | 12/1999 | Kitamura et al. | ............ | 345/582 |
| 6,133,923 A * | 10/2000 | Ozawa | ............ | 345/582 |
| 6,297,833 B1 * | 10/2001 | Ho et al. | ............ | 345/581 |
| 6,411,397 B1 * | 6/2002 | Petteruti et al. | ............ | 358/1.18 |
| 6,680,741 B1 * | 1/2004 | Yasui et al. | ............ | 345/619 |
| 7,027,054 B1 * | 4/2006 | Cheiky et al. | ............ | 345/473 |
| 7,076,099 B2 * | 7/2006 | Kondo et al. | ............ | 382/203 |
| 7,302,111 B2 * | 11/2007 | Olsson et al. | ............ | 382/266 |
| 2004/0179751 A1* | 9/2004 | Chang et al. | ............ | 382/299 |

* cited by examiner

Primary Examiner—King Y Poon
Assistant Examiner—Allen H Nguyen
(74) Attorney, Agent, or Firm—Harness, Dickey & Pierce, P.L.C.

(57) ABSTRACT

A method of printing geometric figures recalculates and recombines coordinates of the scan lines or poly scan lines to transform into polygonal geometric figures with less output the data and command length, thereby increasing the printing speed of a printer. The method also can be applied to any geometric figures or texts constructing by the scan lines or the poly scan lines.

6 Claims, 7 Drawing Sheets

Line 1 : (0,0)-(10,0)  Line 5 : (20,0)-(30,0)  Line  9 : (40,0)-(50,0)
Line 2 : (0,1)-(10,1)  Line 6 : (20,1)-(30,1)  Line 10 : (40,1)-(50,1)
Line 3 : (0,2)-(10,2)  Line 7 : (20,2)-(30,2)  Line 11 : (40,2)-(50,2)
Line 4 : (0,2)-(10,3)  Line 8 : (20,3)-(30,3)  Line 12 : (40,3)-(50,3)

METHOD OF PRINTING GEOMETRIC FIGURES

BACKGROUND OF THE INVENTION

1. Field of Invention

The present invention relates to a method of printing geometric figures, and more particularly to a method of printing geometric figures in which coordinates are recombined to speed up geometric figures layout.

2. Related Art

As the information technology rapidly develops, the world today has been well computerized and the interconnected network has also spread over. Printing devices cannot be omitted in data layout, although the cycle periods of the computer-related products are shorter and shorter. Under the intense competition in the printer market, the printing speed and the print quality are of interest for future development.

In printing, a polygonal figure or text constructed of scan lines or poly scan lines needs a plurality of horizontally linear lines or rectangular lines.

Figure 1:
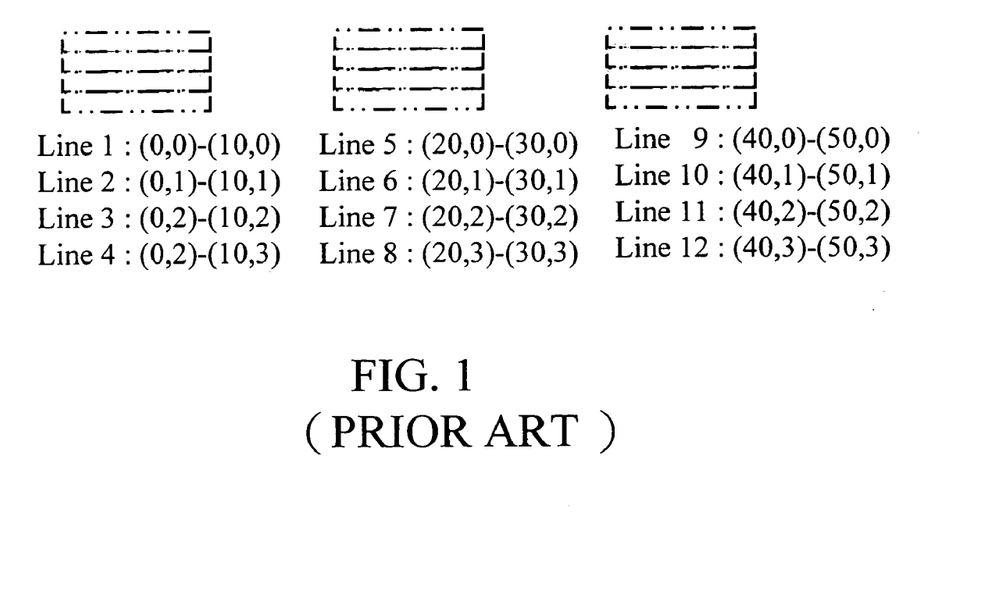
FIG. 1 is a schematic view of a method of drawing scan lines in the prior art.

In FIG. 1, a conventional method of drawing scan lines draws the lines one by one from top to bottom or in the reverse direction, each line being next to the other.

If the geometric figure is constructed of four sets of scan lines which are respectively indicated in two-dimensional coordinates:

First set: (0,0)-(10,0); (20,0)-(30,0); (40,0)-(50,0)
Second set: (0,1)-(10,1); (20,1)-(30,1); (40,1)-(50,1)
Third set: (0,2)-(10,2); (20,2)-(30,2); (40,2)-(50,2)
Fourth set: (0,3)-(10,3); (20,3)-(30,3); (40,3)-(50,3)
Command format: PE=<$X_1,Y_1$, ($X_2$-$X_1$), ($Y_2$-$Y_1$);
Output command: PE=<0,0,10,0;
  PE=<20,0,10,0;
  PE=<40,0,10,0;
  PE=<0,1,10,1;
  PE=<20,1,10,1;
  PE=<40,1,10,1;
  PE=<0,2,10,2;
  PE=<20,2,10,2;
  PE=<40,2,10,2;
  PE=<0,3,10,3;
  PE=<20,3,10,3;
  PE=<40,3,10,3;
The command length=4 bytes;
The coordinate length of each set=4 bytes;
Therefore, the estimated command length which is needed=(4-byte commands+4 bytes*2 sets of coordinates)*12 sets of commands=144 bytes.

Figure 2:
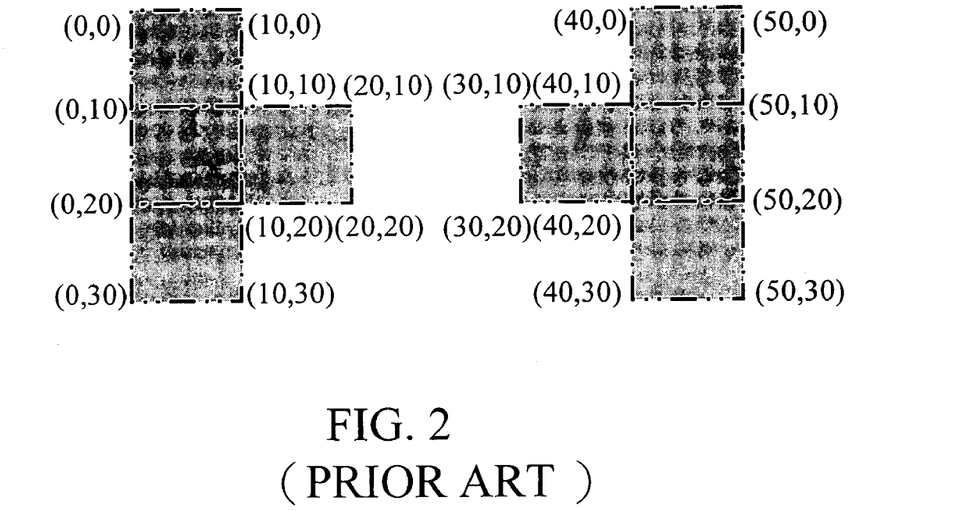
FIG. 2 is a schematic view of a method of drawing poly scan lines in the prior art.

As shown in FIG. 2, the conventional method of drawing the poly scan lines draws one row of rectangular figures each time from top to bottom or from bottom to top. The adjacent rectangular figures are next to each other or partially superimpose each other.

As illustrated, it is assumed that the geometric figure is constructed of three sets of poly scan lines, which respectively indicate two-dimensional coordinates:

First set:
{(0,0),(10,0),(10,10),(0,10)},{(40,0),(50,0),(50,10),(40,10)}
Second set:
{(0,10),(20,10),(20,20),(0,20)}, {(10,10),(20,10),(20,20),(10,20)}, {(30,10),(40,10),(40,20),(30,20)}, {(40,10),(50,10),(50,20),(40,20)}
Third set:
{(0,20),(10,20),(10,30),(0,30)}, {(40,20),(50,20),(50,30),(4,30)}

Command format:
PE=<$X_1,Y_1$, ($X_2$-$X_1$), ($Y_2$-$Y_1$), . . . ($X_n$-$X_{n-1}$, $Y_n$-$Y_{n-1}$), ($X_1$-$X_n$,$Y_1$-$Y_n$);
Output command: PE=<0,0,10,0,0,10,−10,0,0,−10;
  PE=<40,0,10,0,0,10,−10,0,0,−10;
  PE=<0,10,10,0,0,0,10,−10,0,0,−10;
  PE=<10,10,10,0,0,10,−10,0,0,−10;
  PE=<30,10,10,0,0,0,10,−10,0,0,−10;
  PE=<40,10,10,0,0,10,−10,0,0,−10;
  PE=<0,10,10,0,0,0,10,−10,0,0,−10;
  PE=<40,10,10,0,0,0,10,−10,0,0,−10;
The command length=4 bytes;
The coordinate length of each coordinate=4 bytes;
Therefore, the estimated command length=(4-byte command+4 bytes*5 coordinates)*8 sets of commands=192 bytes○

The above-mentioned method needs to output a lot of commands and coordinates. When these data are transmitted to a printer, the printing operation takes time and some geometric figures repeat or superimpose each other, which slows down the printing speed.

SUMMARY OF THE INVENTION

In order to solve the above problems, the invention provides a method of printing geometric figures, in which coordinates of the scan lines or the poly scan lines are re-calculated and recombined to reduce the numbers of the commands and coordinates so as to speed up the scan lines or the poly scan lines drawing and thus increase the printing speed of a printer.

In order to achieve the above and other objectives, the method of the invention includes collecting original coordinate couples of the a geometric figure; recombining the original coordinate couples into new coordinate couples; outputting the new coordinate couples to print out the geometric figure.

DETAILED DESCRIPTION OF THE INVENTION

Figure 3:
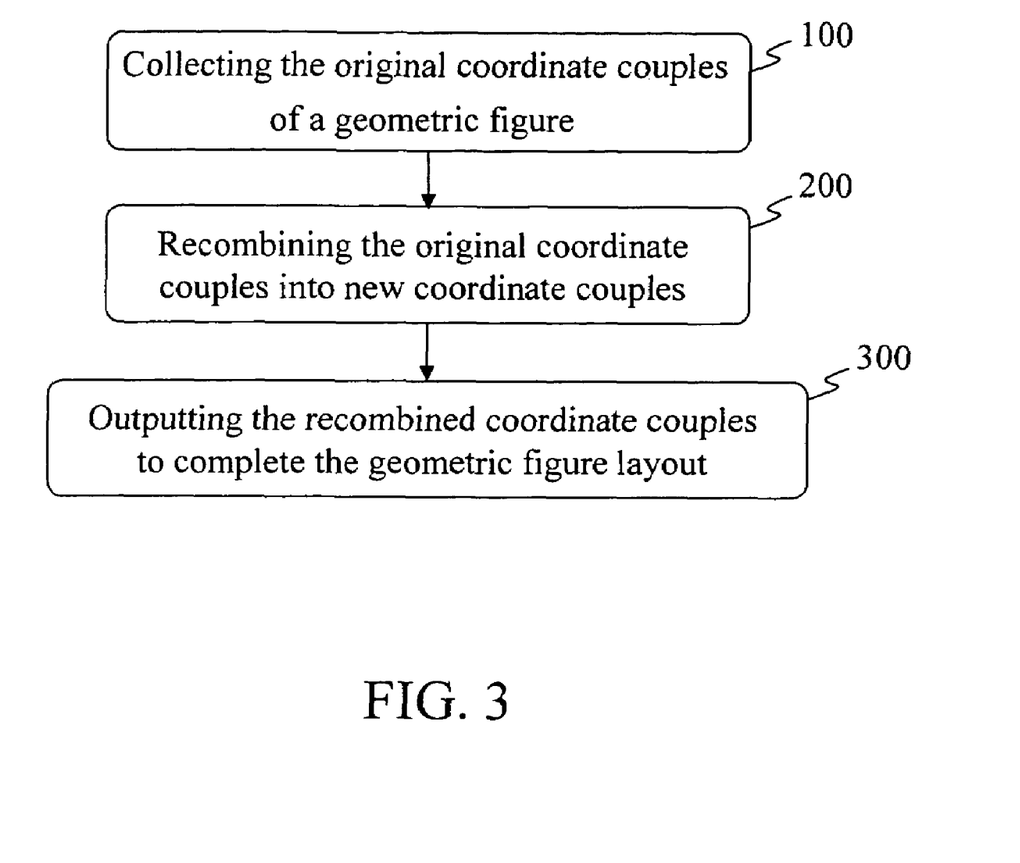
FIG. 3 is a flow chart of a method of printing geometric figures according to one embodiment of the invention.

As shown in FIG. 3, a method of printing geometric figures includes the following steps.

The first step is collecting the original coordinate couples of a geometric figure (step 100). The original coordinate couples include coordinate couples of scan lines or poly scan lines. Next, the original coordinate couples are recombined (step 200). The original coordinate couples saved in buffers are recalculated and recombined into new coordinate couples. Finally, an output mode is set for new coordinate couples output and the geometric figure layout (step 300).

Here below is the description of coordinate recombination.

1. Collecting the Original Coordinate Couples of a Geometric Figure (Step 100):

The coordinate couples of the scan lines and the poly scan lines received are respectively saved in a predetermined buffer to judge whether next coordinate couple should be received. If the received coordinate couple is the last one of coordinate couples of the scan lines or poly scan lines, then go to the next step. Collecting the coordinate couples of the scan lines and poly scan lines is as follows.

Figure 4:
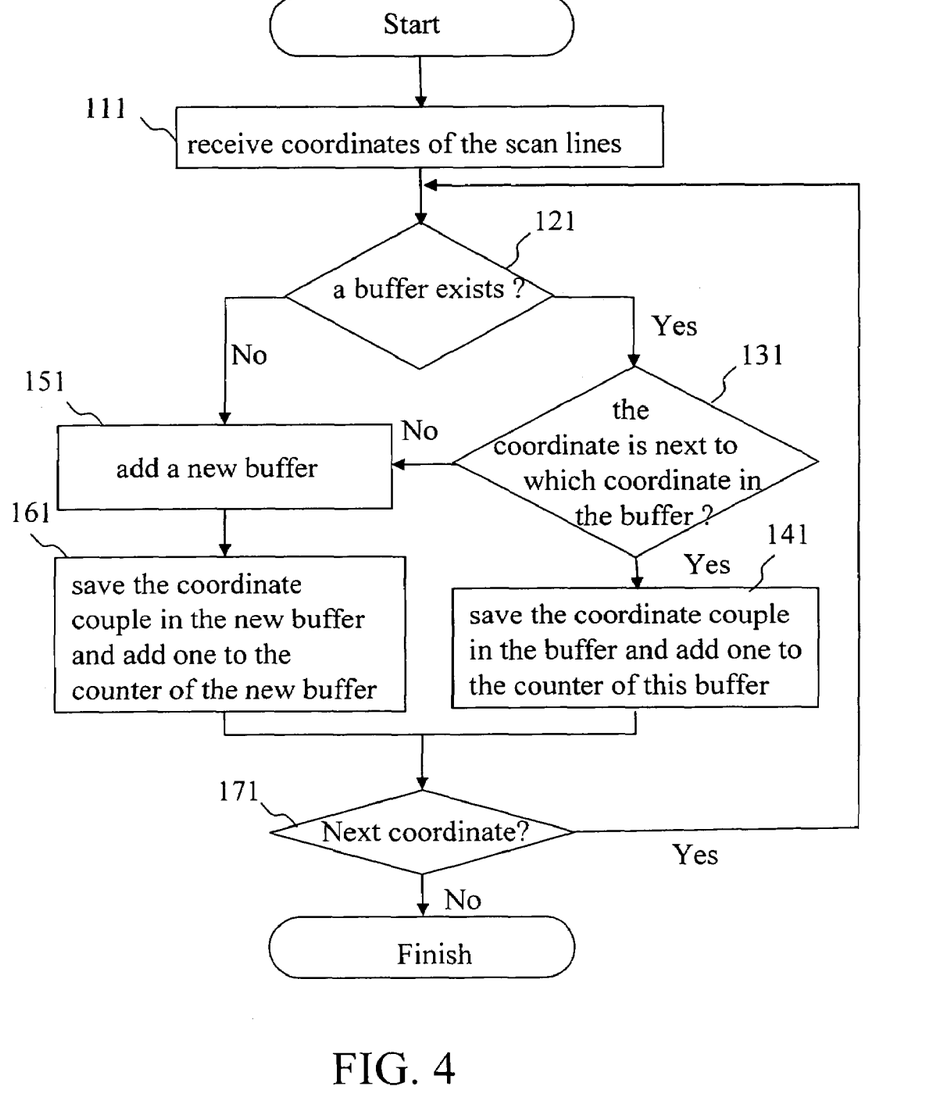
FIG. 4 is a flow chart of collecting coordinates couples of scan lines according to one embodiment of the invention.

(1) Collecting the Coordinates of the Scan Lines:

Referring to FIG. 4, it is assumed that there are total N scan lines, each having a start coordinate and an end coordinate. Therefore, there are total 2N coordinates. For example, an i-th scan line can be represented by an i-th coordinate couple $(X_i,Y_i)-(X_{i+1},Y_{i+1})$, wherein i is an integer of 1 from N.

2N coordinates are received (step 111). The received coordinates are respectively saved in the buffers. Then check whether a buffer exists (step 121). When the buffer exists, then check if the coordinate couple $(X_i,Y_i)-(X_{i+1},Y_{i+1})$ is next to which coordinate couple in the buffer (step 131). If the result of steps 121 is YES and the result of step 131 is found, then, save the found coordinate couple $(X_i,Y_i)-(X_{i+1},Y_{i+1})$ in the buffer and add one to the counter of this buffer (step 141). If the designated coordinate couple $(X_i,Y_i)-(X_{i+1},Y_{i+1})$ is not next to any coordinate couple or the buffer does not exist, then add a new buffer (step 151). Save the designated coordinate couple $(X_i,Y_i)-(X_{i+1},Y_{i+1})$ in the new buffer and add one to the counter of this new buffer (step 161). Then, go for receiving coordinates of other scan lines in the above manner (step 171).

Figure 5:
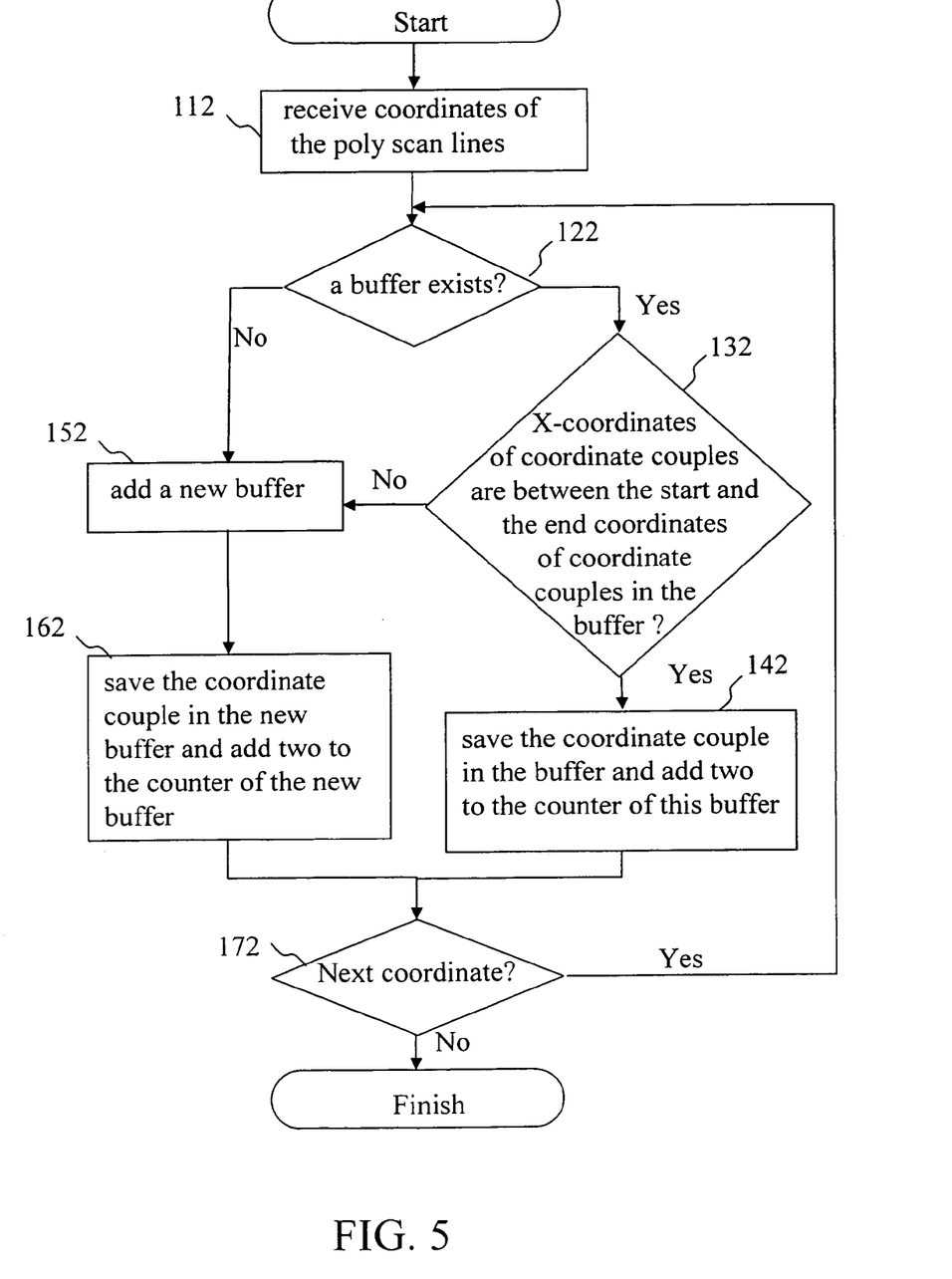
FIG. 5 is a flow chart of collecting coordinates couples of poly scan lines according to one embodiment of the invention.

(2) Collecting the Coordinates of the Poly Scan Lines:

Referring to FIG. 5, it is assumed that there are total N/2 poly scan lines, each having two line segments for two scan lines. Therefore, there are total N scan lines. Each line segment is represented by two coordinates, totaling 2N coordinates. For example, the two coordinate couples of the i-th poly scan line is represented by $(X_i,Y_i)-(X_{i+1},Y_i)$ and $(X_i,Y_{i+1})-(X_{i+1},Y_{i+1})$, wherein i is one integer of 1 from N/2.

2N coordinates are received (step 112). The received coordinates are respectively saved in the buffers. Then check whether a buffer exists (step 122). When the buffer exists, then check if the X-coordinates of coordinate couples $(X_i,Y_i)-(X_{i+1},Y_{i+1})$ and $(X_i,Y_{i+1})-(X_{i+1},Y_{i+1})$ are between the start coordinates and the end coordinates of the coordinate couples thereof in the buffer (step 132). If the above results are YES, then, save the coordinate couples $(X_i,Y_i)-(X_{i+1},Y_{i+1})$ and $(X_i,Y_{i+1})-(X_{i+1},Y_{i+1})$ in the buffer and add two to the counter of this buffer (step 142). If the X-coordinate of coordinate couples $(X_i,Y_i)-(X_{i+1},Y_{i+1})$ and $(X_i,Y_{i+1})-(X_{i+1},Y_{i+1})$ are not between the start coordinates and the end coordinates of the coordinate couples thereof in the buffer, or the buffer does exist, then add a new buffer (step 152). Save the coordinates $(X_i,Y_i)-(X_{i+1},Y_{i+1})$ and $(X_i,Y_{i+1})-(X_{i+1},Y_{i+1})$ in the new buffer and add two to the counter of this new buffer (step 162). Then, go for receiving coordinates of other poly scan lines in the above manner (step 172).

2. Recombining the Original Coordinate Couples into New Coordinate Couples (Step 200):

According to the relationship between the line segment and its slope, the intermediate coordinates among those formed by one straight line penetrates through vertically adjacent scan lines or poly scan lines are removed.

Figure 6:
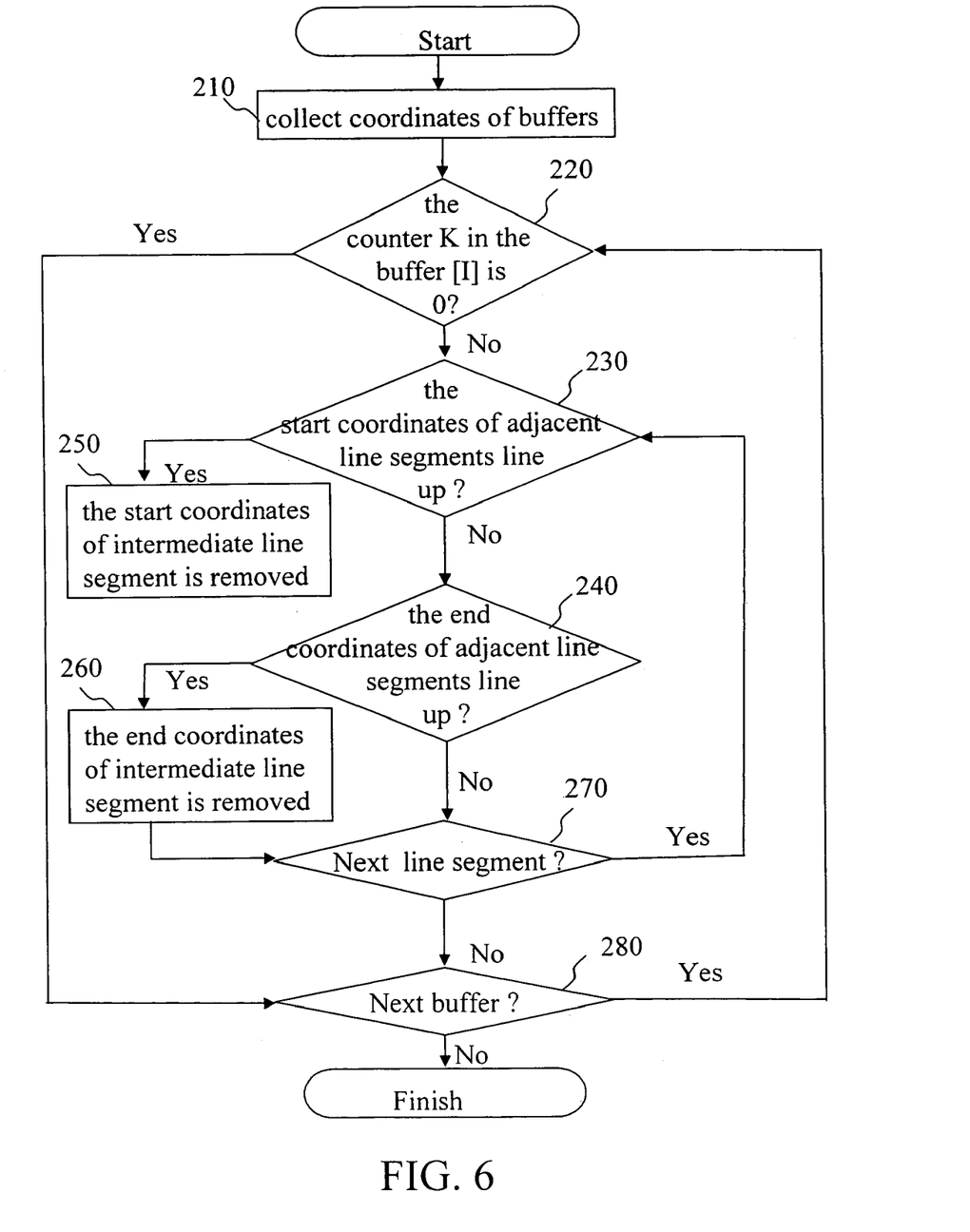
FIG. 6 is a flow chart of recombining original coordinate couples according to one embodiment of the invention.

Referring to FIG. 6, it is assumed that there are total N buffers. Buffer [I] indicates an I-th buffer, wherein I is one integer of from 1 to N. The buffer [I] includes K coordinates (K/2 line segments).

Collect coordinates of buffers (step 210). Check whether the number of a counter K in the buffer [I] is zero (step 220). If YES, then check the next buffer (step 280). If NO, then pick up J-th line segment (J=3~K/2) of scan line and check whether the start coordinates and the end coordinates of J-1, J-2, and J-th line segments line up (step 230, 240). If the result is Yes, the start or end coordinates of intermediate line segments (for example, J-1-th line segment) are removed (step 250, 260). Then the remaining coordinates of all line segments coordinates in the buffer [I] are recombined (step 270). Then, go for coordinate recombination in other buffers in the above manner (step 280).

3. Outputting the New Coordinate Couples to Complete the Geometric Figure Layout (Step 300):

The recombined coordinate couples (new coordinate couples) are encoded to output the geometric figures.

Figure 7:
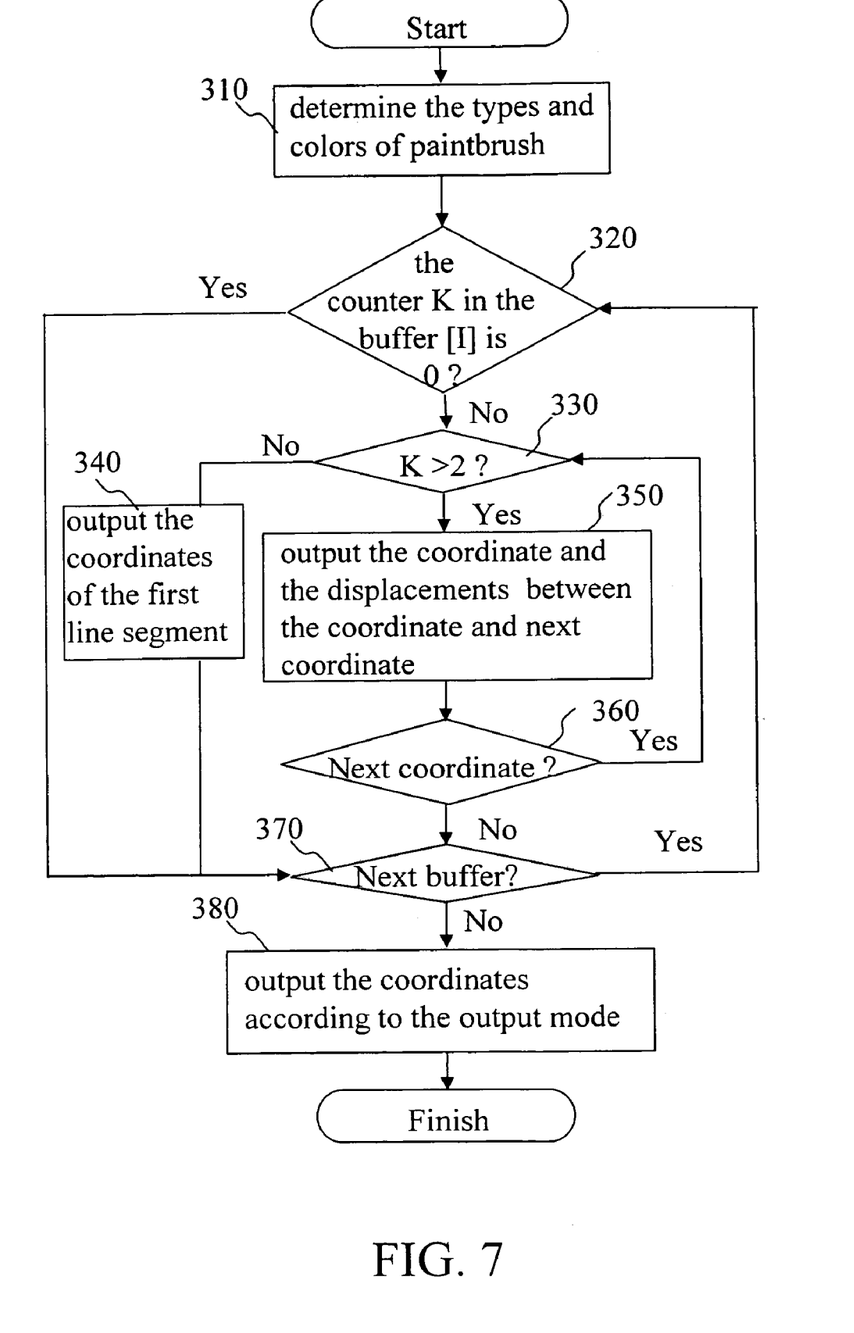
FIG. 7 is a flow chart of outputting new coordinate couples according to one embodiment of the invention.

Referring to FIG. 7, it is assumed that there are total N buffers. Buffer [I] indicates the I-th buffer, wherein I is an integer of 1 to N. The buffer [I] includes K coordinates.

Determine the types and colors of paintbrush in the scan lines or poly scan lines (step 310). Check if the counter K of the buffer [I] is zero or not (step 320). If YES, then check the next buffer (step 370). If NO, then check if the counter K is larger than 2 (step 330) to output the coordinates of the buffer [I]. When the counter K=1 or 2, the coordinate couple $(X_1,Y_1)-(X_2,Y_2)$ of the first line segment at the poly scan line are output (step 340). When the counter K>2 and J=4~K, J-th coordinate and the displacements between J-th coordinate and J-1-th coordinate are output and go for the other coordinates. When the counter K>2 and the J=K-1~3, J-th coordinate and the displacements between J-th coordinate and J-1-th coordinate are output (step 350) and go for the other coordinates (step 360). Then, finish the coordinates output of all buffers (step 370). Output the coordinates according to the output mode (step 380) for printing out the geometric figure.

In the following example, the method of the invention recalculates and recombines the coordinates of the scan lines and poly scan lines, and compares the required command length with that of the prior art.

1. Drawing of the Scan Line:

In the method of the invention, if the start coordinates or end coordinates of the vertically adjacent three lines as shown in FIG. 1 line up, the intermediate start or end coordinate(s) are removed. The results are obtained as follows and shown in FIG. 8.

Figure 8:
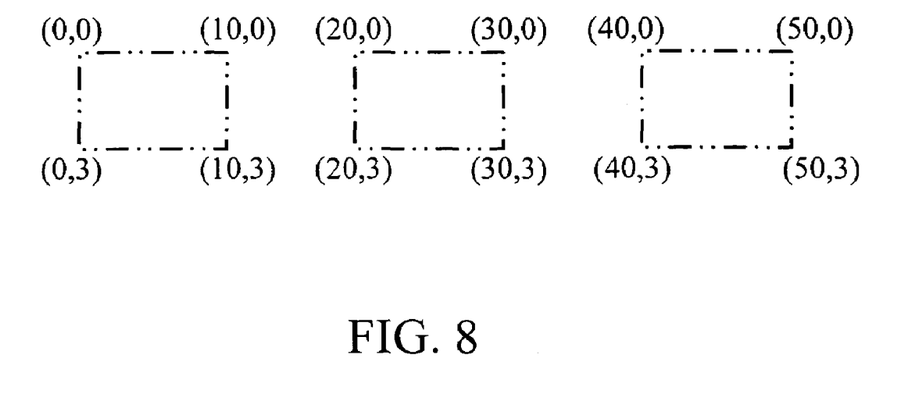
FIG. 8 is a schematic view of drawing scan lines according to one embodiment of the invention.

Command format: PE=<$X_1$, $Y_1$, ($X_2$-$X_1$), ($Y_2$-$Y_1$), . . . ($X_n$-$X_{n-1}$, $Y_n$-$Y_{n-1}$), ($X_1$-$X_n$,$Y_1$-$Y_n$);

Output command: PE=<0,0,10,0,0,3,-10,0,-3,0;
PE=<20,0,10,0,0,3,-10,0,-3,0;
PE=<40,0,10,0,0,3,-10,0,-3,0;

Command length=4 bytes;
The length of each coordinate=4 bytes;
The estimated length which will be needed=(4 bytes command+4 bytes*5 coordinates)*3 commands=72 bytes.
Therefore, the required command length (72 bytes) in the invention is smaller than the prior art (144 bytes).

2. Drawing the Poly Scan Line:

Referring to FIG. 2, the intermediate points among the points that form by penetrating one line through two vertically adjacent rectangles are removed. The results are obtained as follows and shown in FIG. 9.

Figure 9:
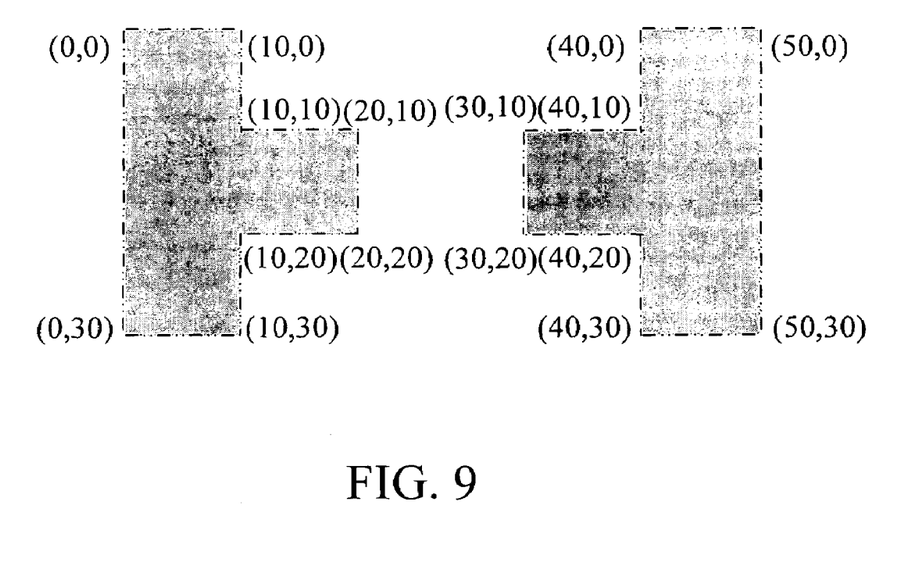
FIG. 9 is a schematic view of drawing poly scan lines according to one embodiment of the invention.

Command format: $PE=<X_1,Y_1,(X_2-X_1),(Y_2-Y_1),\ldots(X_n-X_{n-1},Y_n-Y_{n-1}),(X_1-X_n,Y_1-Y_n)$;

Output command: PE=<0,0,10,0,0,10,10,0,0,10,−10,0,0, 10,−10,0,0,−30;
  PE=<40,0,10,0,30,−10,0,0,−10,−10,0,0,−10,10,0,0,−10;

Command length=4 bytes;
The length of each coordinate=4 bytes;
The estimated command length which is needed=(4-byte command+4 bytes*9 coordinates)*2 commands=80 bytes.

Therefore, printing the poly scan lines needs less command length (80 bytes) than the prior art (192 bytes).

Compared with the prior art, the invention effectively prints the scan lines and the poly scan lines with less commands and coordinates.

Here are provided layouts made by the invention and the prior art and some data for comparison.

The test system used in the invention is a Pentium4-1.5 GHz desktop, 256 MB SDRAM, operation system: Windows 98 (English version; test printer: HP 4600; test program: Adobe Acrobat 5.0.5 (Japanese text), and test file: IRC3200.pdf (24 pages).

The data output from an outlet is transformed into a file. A test program outputs a test file, of which the size is recorded. Then, the outlet is given a TCP/IP address and tested by the test program. The time needed to print is recorded.

The test results are as follows.

The size of data generated in the prior art=38,789K bytes
The size of data generated according to the invention=30,012 K bytes
Printing time in the prior art=460.47 seconds
Printing time according to the invention=256.07 seconds Therefore, the layout of the geographic figures needs data less by about 22% and printing time shorter by about 44%.

Compared with the prior art, the layout of the geometric figures can be achieved with less output data and improved printing speed according to the invention.

As described above, the method of the invention recalculates and recombines the coordinates of the scan lines or poly scan lines to transform polygonal geometric figures. Furthermore, the command length and data are less than those needed in the prior art, thereby increasing the printing speed. Therefore, the method of the invention can be applied to any geometric figures or texts constructing by the scan lines or the poly scan lines.

Certain variations would be apparent to those skilled in the art, which variations are considered within the spirit and scope of the claimed invention.

What is claimed is:

1. A method of printing geometric figures, comprising:
   collecting a plurality of original coordinate couples of a geometric figure, the original coordinate couples includes coordinate couples of a plurality of scan lines and/or a plurality of poly scan lines;
   recombining the original coordinate couples into a plurality of new coordinate couples, wherein intermediate coordinates among vertically adjacent original coordinate couples that line up are removed,
   collecting the original coordinate couples further includes:
     receiving the original coordinate couples; and
     saving a plurality of coordinate couples at adjacent of scan lines into the same buffer and/or saving a plurality of coordinate couples at adjacent poly scan lines in the same buffer, wherein when the original coordinate couple is the last one, then perform the recombination of the original couples, otherwise, continue receiving and checking other coordinate couples; and
   outputting the new coordinate couples to print out the geometric figure.

2. The method of claim 1, wherein saving the original coordinate couples into the buffers includes saving a plurality of coordinate couples at adjacent poly scan lines in the same buffer.

3. The method of claim 1, wherein recombining the original coordinate couples further includes saving the new coordinate couples into a plurality of buffers.

4. The method of claim 1, wherein outputting the new coordinate couples to print out the geometric figure further includes outputting the new coordinate couples and the displacements between the new coordinate couples and the next coordinate couple.

5. The method of claim 1, wherein outputting the new coordinate couples to print out the geometric figure further includes setting an output mode.

6. The method of claim 2, wherein the output mode includes types and colors of paintbrush.

* * * * *